Patented May 11, 1943

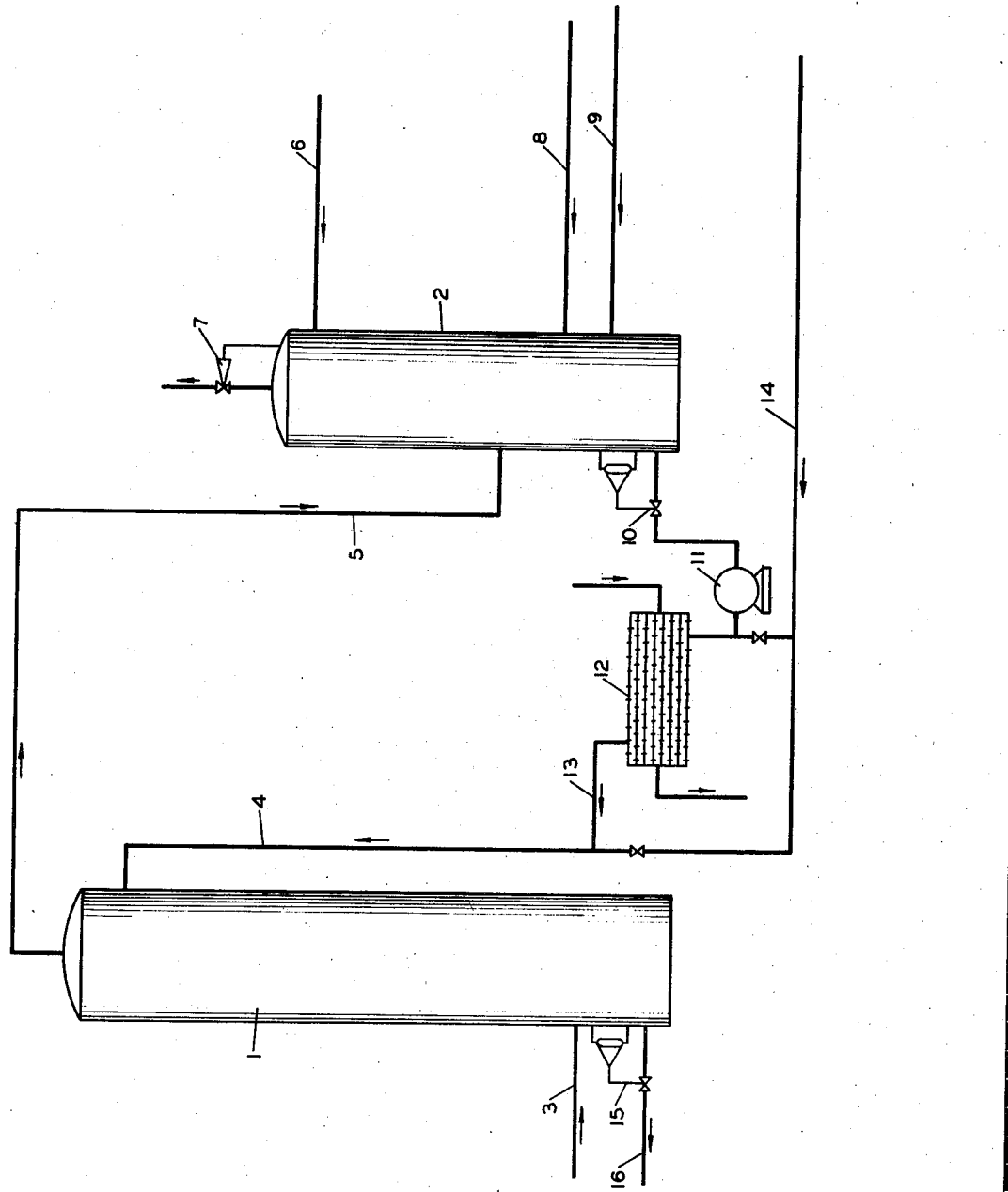

2,318,752

UNITED STATES PATENT OFFICE 2,318,752

TREATMENT OF GASES

Samuel C. Carney, Bartlesville, Okla., assignor to Phillips Petroleum Company, a corporation of Delaware Application June 10, 1940, Serial No. 339,833

2 Claims. (Cl. 183—114.6)

This invention relates to a process for recovering valuable hydrocarbons from mixtures of hydrocarbon gas by absorption.

More particularly it relates to a method for minimizing the rise in temperature in an absorber of the absorbent used for recovering desirable hydrocarbons from mixtures of hydrocarbon gas.

In any absorption process there is heat evolved due to the latent heat of condensation of the components which are absorbed. The heat of condensation raises the temperature in the absorber which in turn reduces the absorption capacity of the oil. Various methods have been devised for cooling an absorber or preventing a part of the temperature rise. Some of these methods cool the absorption medium before it enters the absorber, while others cool the absorbent at some intermediate point in the absorber. Still others have added some undesirable lighter components to the lean oil prior to its introduction into the absorber to prevent the absorption of these undesirable components from the gas stream.

The present invention keeps the absorber cool by altering the composition of the lean absorbent prior to its introduction into the absorber. Volatile hydrocarbons available in the absorption plant added to the lean absorbent in the present process are of such nature that under the conditions prevailing in the absorber, part of the added components evaporate into the gas stream and by their latent heat of evaporation remove an equivalent amount of heat resulting from the latent heat of condensation of components being absorbed. Others have attempted to accomplish cooling by this means heretofore by separating volatile components from the rich absorbent from the base of the absorber and adding these volatile components to the lean absorbent before its introduction into the top of the absorber. It is to be noted that such processes fail to accomplish cooling by evaporation in the absorber since the volatile components added to the lean oil must first be absorbed in the absorber which they are attempting to cool. Hence, whatever evaporation takes place from the absorbent serves only to offset the condensation of that same component into the absorbent and the net result is that the recycled volatile components serve only partly to saturate the absorbent and prevent absorption of those components. The present process recirculates a part of the undesirable components, thus avoiding a part of the heat of absorption and at the same time supplies an additional quantity of volatile components to the top of the absorber. These additional components are stripped from the absorbent in the absorber by heat of condensation of less volatile components and in being stripped remove an equivalent quantity of heat as heat of vaporization. The more volatile components vaporized in this manner pass off the top of the absorber with unabsorbed gases and are absorbed in an auxiliary absorber herein called a saturator. The heat of absorption or condensation resulting from absorption of the more volatile components in the saturator is removed in a cooler after which the volatile components are again passed to the top of the absorber, thus completing the cycle. It is seen that a part of the volatile components form a refrigeration cycle of the absorption type which is operable without resorting to the use of compressors.

An object of this invention is to provide a novel method for cooling absorbers.

Another object of this invention is to provide a method for increasing recovery of desirable components in an absorber by minimizing the temperature rise.

Still another object of this invention is to provide a method of preparing an improved absorbent for use in absorbing desirable hydrocarbons from a hydrocarbon gas stream.

These and other objects will be apparent from the following detailed description and the accompanying drawing.

The drawing is a diagrammatic flow sheet representing apparatus adapted to carry out the process of the present invention.

With reference to the drawing, the numeral 1 designates the absorber of a conventional absorption plant and the numeral 2 designates a saturator for conditioning the absorbent prior to its introduction into the absorber. Rich gas from pipe 3 enters the base of the absorber 1 in which it is brought into intimate countercurrent contact with a stream of specially prepared absorbent entering the top of the absorber through pipe 4. Gas from the top of the absorber flows through pipe 5 to a point intermediate the top and bottom of the saturator 2. The saturator 2 may be any suitable device in which a stream of absorbent may be brought into intimate countercurrent contact with a stream of gas. The applicant has found that a bubble plate column having six to ten plates above the entrance of pipe 5 and at least six plates below the entrance of pipe 5 serves the purpose very well for use in connection with natural gasoline absorption. At the top of the saturator a pipe 6 supplies a stream of cold, thoroughly stripped absorbent. This is the "lean oil" as known in the art and it comes from the still, heat exchangers, and oil coolers of the conventional absorption plant, the elements of which are well known and are not shown in the drawing. Stripped absorbent entering through pipe 6 flows down over the plates of the saturator and absorbs from the gas a definite percentage of each component in the gas. Gas which is not absorbed by the absorbent passes through the back pressure regulator 7 at the top of the column to be utilized for the usual purposes. The operating pressure of the saturator, as controlled by the regulator 7, is substantially the same as that of the absorber. At a point below the entrance of pipe 5, a pipe 8 introduces into the saturator a stream of gas, available in the absorption plant, which has a lower methane content than the gas entering through pipe 5. Similarly, at a point below the entrance of the pipe 8, a pipe 9 introduces into the saturator a stream of gas having a still lower methane content. Liquid from the bottom of the saturator, as controlled by a float-actuated valve 10, flows to pump 11 from which it is pumped through the cooler 12 where the heat resulting from absorption in the saturator is removed. After cooling, the liquid from the base of the saturator flows through pipe 13 into pipe 4 where it is mixed with liquid from pipe 14 containing substantially no components less volatile than propane. If desired the liquid from pipe 14 may be added before the cooling step. The solvent oil thus conditioned flows through line 4 to the top of absorber 1. Rich absorbent from the base of the absorber is withdrawn through the float controlled valve 15 and the pipe 16 through which it passes to the heat exchangers and still of the conventional absorption plant, not shown in the drawing, thus completing the absorbent cycle.

The gas introduced into the saturator through the pipe 8 may be gas, known in the art as "reabsorber residue gas" or "recompressor residue gas." Some plants have a reabsorber, some have a recompressor, and some have both. In the average plant there is available a stabilizer top vapor containing mostly ethane and propane. Such a vapor may be advantageously introduced into the saturator through the pipe 9. In the average plant there are available three grades of gas substantially free of components heavier than propane and containing decreasing percentages of methane. If other gases containing chiefly components more volatile than the desired plant product are available, they may be introduced into the saturator according to the teachings of this invention at successively lower points, in the order of decreasing methane content. Liquid added to the absorbent stream through pipe 14 may be liquid from the top of the rectifier (not shown) of the conventional absorption plant.

It should be noted that the gas leaving the top of the absorber is much different in composition from the residue gas which ordinarily leaves the top of the conventional absorber substantially in equilibrium with the absorbent on the top plate. Gas leaving the top of the absorber 1 in the present invention is substantially in equilibrium with a specially prepared absorbent, not stripped of all the components, but containing a considerable quantity of absorbed volatile components, chiefly ethane and propane. Therefore, it is apparent that gas leaving the top of the absorber comprises a larger quantity of volatile components than would ordinarily leave the absorber. This gas is contacted in the upper plates of the saturator 2 with stripped absorbent so that the residue gas leaving the system at the top of the saturator is substantially in equilibrium with stripped absorbent entering the top of the saturator. Thus it is apparent that the absorbent in saturator 2 absorbs a considerable quantity of hydrocarbons from the gas stream entering through pipe 5. The absorbent flowing down the saturator is also brought into intimate countercurrent contact with gas introduced through the pipes 8 and 9. The ratio of liquid to vapor on the lower plates of the saturator is considerably greater than in any other part of the absorption system and hence the absorbent is capable of absorbing a greater amount of the more volatile hydrocarbons in the base of the saturator than it can hold in the absorber. It is the vaporization of these volatile hydrocarbons that causes cooling in the absorber. Specific examples will tend to clarify this explanation.

The combined volume of the gases entering through the pipes 8 and 9 is always less than the volume of gas entering through the pipe 5. If the absorption factor for propane in the absorber and in the top plates of the saturator is .15, a value quite common in the art, it may be 1.0 in the lower portion of the saturator because of the higher ratio of absorbent to gas. This makes for more complete solution of components other than methane and even to some desorption of methane from the absorbent in the lower portion of the saturator. Due to the higher concentration of hydrogen sulfide (if present in the gas treated), ethane, and propane in the gas from pipe 9, the methane content of the oil leaving the absorber is reduced and still more components with volatility lying between methane and butane are dissolved, both due to the large absorption factor and to their high partial pressures in the gas supplied to the lower plates of the saturator.

The prepared absorbent stream, thus conditioned, is introduced into the top of the absorber where it comes into contact with gas of higher methane content than that corresponding to the equilibrium the absorbent had attained at the base of the saturator. Upon coming in contact with this gas, partial vaporization of some of the more volatile components from the absorbent will occur with removal of heat from the absorbent. Solution of butane and pentane will begin and if these are not present and dissolved in amounts equivalent to the amount of volatile components vaporized, there will be a lowering of temperature on the upper plates of the absorber. As the absorbent flows farther down the absorber, it is contacted with increasing percentages of the more soluble components. Any volatile components added to the absorbent in the saturator in excess of the amount permitted by the equilibrium at the base of the absorber are evaporated from the absorbent thus removing as latent heat of vaporization an equal amount of heat of solution of butane and heavier components. The volatile components in the absorbent which are not evaporated tend to prevent temperature rise by their presence since their presence precludes, to some extent, absorption of these same components. That amount of the volatile components required for equilibrium at the base of absorber remains in solution and leaves the absorber with the rich oil. The heat of solution of these volatile components does not appear in the absorber since they enter with the absorbent at the top of the absorber.

A part of the volatile components added to the absorbent stream in the saturator are used more than once. When the system reaches a steady state, part of the volatile components form a closed cycle, entering the absorber as a liquid, leaving it as a vapor, being absorbed in the upper part of the saturator and returning to the absorber as a liquid. The amount which will be recycled depends upon the absorption factors as influenced by the temperature, but chiefly by the operating pressure.

Example 1

A process embodying the present invention may be operated at a pressure of 50# per square inch absolute and a stipped absorbent inlet temperature of 80° F. Under these conditions and with an absorption factor for recovery of all the pentane, the factor for propane is approximately .14. That is, when operating such a process with an absorbent rate sufficient to recover all of the pentane, 14% of the propane will be recovered from the gas in the upper portion of the saturator. No propane is removed from the gas phase in the absorber and on the contrary about all of the 14% previously recovered in the saturator is added to the gas stream in the absorber thereby raising the propane content of the gas entering the saturator through pipe 5 to 114% of the original. Recovery of 14% of the propane then entering the saturator through pipe 5 makes recovery of propane in the saturator equal 16% of the original propane content. When a steady state is reached, the recycle stream of propane is equivalent to about 16½% of the original propane content.

Example 2

To show the greater utility of the process at higher pressures, the process is operated at a pressure of 1500# per square inch absolute and with a stripped absorbent inlet temperature of 80° F. At this pressure, and again with an absorption factor for recovery of all the pentane, the factor for propane indicates a recovery in the upper portion of the saturator of 28.6% of the propane. When operating continuously a steady state is reached wherein a recycle stream of propane is equal to about 40% of the original propane content.

Thus the efficiency of the cycle is greater at higher pressures where there is greater need for such a method. The greater need for cooling arises fom the fact that at high pressures there is a smaller amount of oil present to receive latent heat of solution and at the same time a larger part of the more volatile components are absorbed giving up latent heat of condensation.

This recycling occurs with other components as governed by their absorption factors. The present process includes the use of hydrogen sulfide as a suitable volatile component to be added to the absorbent in the saturator. Hydrogen sulfide is often present in the natural gas to be treated, sometimes in proportions as high as 7% by volume. The latent heat of hydrogen sulfide is greater than that of propane and substantial amounts are absorbed in the absorber and appear in the rectifier tops. Thus a gas entering through pipe 9 of the drawing may contain from 15 to 30% by volume of hydrogen sulfide. Though in all respects it is an undesirable impurity, use may be made of its physical property of latent heat of vaporization.

The present process does not reduce recovery from the gas, even of those components added to the oil. The recovery of those components is increased to the extent that the absorption factors for the components are increased by the lower temperature in the bottom of the absorber. Their absorption is not hindered by the process, because it occurs in the upper portion of the saturator where the gas is contacted with the stripped absorbent rather than in the absorber where the conditioned absorbent is used.

In regard to the quantities of gas introduced through pipes 8 and 9 and liquid introduced through pipe 14, it will be plain to those skilled in the art that in a plant which rectifies its own product it is desirable to introduce all of the gas from the sources previously mentioned and to introduce stabilizer tops as a liquid rather than as a vapor when reasonably possible. There may be plants to which this process is applicable where the one plant rectifies the product from other plants. In such installations it is unnecessary to use all of the stabilizer tops for conditioning the absorbent. If an abnormally large amount of stabilizer tops are added to the absorbent, the result will be that the temperature of the absorber will be still further decreased due to its evaporation from the absorbent.

It is especially important in the treatment of gases containing hydrogen sulfide that the hydrogen sulfide admitted to the saturator be added in the highest concentration available at any part of the plant. By operating the process of this invention as herein disclosed, that is, first saturating the lean oil with gas from the absorber, then successively with other mixtures of progressively decreasing methane content, the absorption type refrigeration cycle, previously described and explained by the foregoing examples, is attained. Operation in this manner permits the use temporarily of butane, propane, ethane, hydrogen sulfide, etc., as refrigerants to extract heat from the absorber and deliver it to the cooler 12 without interference with the ultimate recovery of any of the desirable components.

The processes of the prior art have been developed for use in connection with natural gasoline plants in which the propane and lighter components are undesirable in the product. While the foregoing examples are, for comparison with prior processes, taken with reference to a natural gasoline plant operating to make commercial 26 pound natural gasoline, it is to be understood that the process of this invention may be advantageously employed in connection with a plant for recovery of polymerization feed stock. Thus the present process may be operated to recover butane, propane, and ethane in addition to the heavier components.

To accomplish recovery of these lighter components it is necessary that the saturator be operated at a pressure substantially the same as the pressure of the absorber. It is also necessary that the thoroughly stripped absorbent entering the top of the saturator be contacted first with gas leaving the top of the absorber, and that the other gas and vapor mixtures, such as those entering through the pipes 8 and 9 be contacted with the absorbent as shown and described herein and not merely mixed with the gas from the top of the absorber. A plant operating for the recovery of polymerization feed stock will obviously have a higher absorption factor, for example it may be operated under conditions for recovery of all the butane. Butane in larger quantities can then be added in the saturator. With the higher absorption factor, the amount recycled is larger. Broadly speaking, the present process when used in a plant for polymerization feed stock recovery, gives the operator control over the division of the total heat developed between the absorber and the saturator. Of the total heat necessarily developed in any commercial absorption operation, a substantial part of it is due to solution of materials not finally included in the ultimate product. It is true that the higher the recovery of polymerization feed stock, the smaller is the proportion of the heat developed by unwanted materials. By the conventional methods of operating absorbers substantially all of the heat of absorption appears at the bottom of the absorber in the rich absorbent. By use of the present process the heat of solution can be removed at a point where the components in the absorbent are less sensitive to temperature rise. The applicant has discovered that a rise in temperature is less harmful to absorption of propane, for example, than to absorption of pentane.

I claim:

1. In a process of treating a gas which includes a readily liquefiable fraction, a less readily liquefiable fraction and a difficultly liquefiable fraction, to recover the readily liquefiable fraction and a portion of the less readily liquefiable fraction from the gas in an absorption step, the improvement comprising conditioning the absorbent used in the absorption step by passing the lean absorbent into a saturator comprising a liquid-gas contact zone having an initial point and a final point relative to absorbent flow, passing gaseous effluent of the absorption step to the saturator at a point intermediate said initial and final points, and withdrawing gas, termed residue gas, from the initial point of said saturator; passing a first gas containing relatively more of the less readily liquefiable fraction and relatively less of the difficultly liquefiable fraction than the original gas being absorbed, into the saturator at a point between said intermediate point and said final point; and passing a second gas containing still more of the less readily liquefiable fraction and still less of the difficultly liquefiable fraction than the first gas into the saturator at a point adjacent the said final point of the saturator; passing the so conditioned absorbent from the final point of said saturator to a cooling zone, and passing said cooled and conditioned absorbent to the absorption step.

2. In a process of treating a gas which includes a readily liquefiable fraction comprising essentially $C_4$ and heavier hydrocarbons, a less readily liquefiable fraction comprising essentially $C_3$ and $C_2$ hydrocarbons, and a difficultly liquefiable fraction comprising essentially $C_1$ and $C_2$ hydrocarbons, to recover the readily liquefiable fraction comprising essentially $C_4$ and heavier hydrocarbons and a portion of the less readily liquefiable fraction comprising essentially $C_3$ and $C_2$ hydrocarbons from the gas in an absorption step, the improvement comprising conditioning the absorbent used in the absorption step by passing the lean absorbent into a saturator comprising a liquid-gas contact zone having an initial point and a final point relative to absorbent flow, passing gaseous effluent of the absorption step to the saturator at a point intermediate said initial and final points, and withdrawing gas, termed residue gas, from the initial point of said saturator; passing a first gas containing relatively more of the $C_3$ and $C_2$ fraction and relatively less of the $C_1$ and $C_2$ fraction than the original gas being absorbed, into the saturator at a point between said intermediate point and said final point; and passing a second gas containing still more of the $C_3$ and $C_2$ fraction and still less of the $C_1$ and $C_2$ fraction than the said first gas into the saturator at a point adjacent the said final point of the saturator; passing the so conditioned absorbent from the final point of said saturator to a cooling zone, and passing said cooled and conditioned absorbent to the absorption step.

SAMUEL C. CARNEY.